United States Patent [19]
Olson et al.

[11] Patent Number: 5,731,103
[45] Date of Patent: Mar. 24, 1998

[54] METHOD AND APPARATUS FOR POSITIONING A BATTERY TERMINAL STRAP

[75] Inventors: Douglas Olson, Silverton; Bonnie DePriest, Woodburn; Calvin Jagger, Milwaukie; Dennis Moore, Canby; Terry Cole, Oregon City; Chester L. Morley, Hubbard; Leandro Fajardo, Gladstone, all of Oreg.; Gerald Cummins, Union, Ky.; Randall Gryczkowski, Franklin, Wis.; Warren Jensen, Molalla, Oreg.

[73] Assignee: Globe-Union, Inc., Milwaukee, Wis.

[21] Appl. No.: 542,872

[22] Filed: Oct. 13, 1995

[51] Int. Cl.⁶ ..................................................... H01M 2/02
[52] U.S. Cl. ............................................................ 429/186
[58] Field of Search ................................ 429/65, 163, 170, 429/176, 179, 181, 182, 183, 186

[56] References Cited

U.S. PATENT DOCUMENTS

| | | | |
|---|---|---|---|
| 1,874,404 | 8/1932 | Wood | 429/186 |
| 2,199,229 | 4/1940 | Smith | 429/186 |
| 2,261,597 | 11/1941 | Sutherland | 429/186 |
| 4,124,745 | 11/1978 | Knapp et al. | 429/208 |
| 4,336,314 | 6/1982 | Yonezu et al. | 429/66 |
| 4,344,748 | 8/1982 | Oxenreider et al. | 425/143 |

*Primary Examiner*—M. Nuzzolillo
*Attorney, Agent, or Firm*—Harness, Dickey & Pierce, P.L.C.

[57] ABSTRACT

Terminal straps are positioned within a battery container via multiple formations formed integral to the battery container. The unique formations provide for positive location of the terminal straps relative to the battery container and the battery container lid simplifying the manufacturing process and improving product quality.

1 Claim, 2 Drawing Sheets

5,731,103

METHOD AND APPARATUS FOR POSITIONING A BATTERY TERMINAL STRAP

FIELD OF THE INVENTION

The present invention relates generally to energy storage devices and more particularly to a method and apparatus for positioning and supporting a battery terminal strap within a lead-acid battery.

BACKGROUND OF THE INVENTION

Batteries of the lead-acid type, and frequently referred to as starting, lighting and ignition (SLI) batteries, are generally constructed as a series of flat, generally rectangular grids which carry current throughout the battery. The grids also serve as a substrate for supporting electrochemically active materials or "paste" deposited thereon. The paste, as is known in the art, is typically a mixture of lead oxide and a dilute acid solution. A grid supporting an amount of paste is referred to as a "plate", and plates are typically interleaved with separator material to form plate stacks. In a typical 12-volt automotive battery six individual stacks are placed in a plastic container having six separated cavities. As will be appreciated, it is necessary to join the stacks to permit current flow throughout the battery. This is generally accomplished by joining, typically with a welding process, straps cast onto lugs of each of the stacks. Moreover, it is necessary to provide terminal electrodes which extend through the battery container to permit electrical contact with a vehicle electrical system.

The terminals are typically formed as part of a pair of terminal straps which are joined to the stacks positioned in the outer-most cavities in the battery. During the manufacturing process, with the stacks positioned within the cavities and electrically joined, including the outer stacks having a terminal strap joined thereto, a plastic container cover is heat sealed to the container. As will be appreciated, apertures are provided within the container cover to allow the terminals to protrude therethrough. The apertures typically include a lead bushing formed into the container cover through which the terminals extend. In a process often referred to as terminal post burn, the lead bushing and terminal, also made of lead, are fused together thereby sealing and coupling the terminal to the bushing.

As is typically found in manufacturing processes, variation in the size of the container cavities, in the size of the plate stacks, the position of the terminal strap to the plate stacks in the outer cavities, the position of the lead bushing within the container cover, the position of the container cover to the battery container, and others may lead to a condition known as terminal post jamming.

Terminal post jamming is a condition where the terminal post does not pass cleanly through the lead bushing as the container lead is positioned onto the container. Interference between the terminal post and the bushing causes forces to be applied, through the terminal strap, into the plates which may result in damage to the plates, and particularly the lugs, potentially leading to battery failure. In another condition, the terminal posts may not extend sufficiently through the bushings to allow adequate fusing of the terminal post to the bushing.

Present manufacturing processing generally requires some form of rough positioning of the terminal strap within the battery container prior to heat sealing the container cover. This extra processing, while adding significant inefficiencies to the overall manufacturing process, only partially alleviates terminal post jamming and other problems associated with misalignment of the terminal posts.

SUMMARY OF THE INVENTION

The present invention provides a battery of the lead-acid type having a novel battery container and a method of constructing a lead-acid type battery which provides for accurate positioning of the terminal strap within a battery container. As a result, terminal post jamming conditions are greatly reduced and extra processing during manufacturing is eliminated.

The battery container of the present invention is provided with formations in the outer cavities which capture the terminal straps as the stacks are positioned therein. The formations further prevent movement of the terminal strap from side-to-side within the battery container during manufacturing, as well as ensures the terminal strap will extend sufficiently through the container cover for proper fusing of the lead bushings to the terminal posts.

The method of the present invention includes providing formations within the battery container for capturing and positioning the terminal strap therein and capturing the terminal straps within the formation as the stack is positioned within the cavity.

DETAILED DESCRIPTION OF A PREFERRED EMBODIMENT

The present invention provides a method and apparatus for positioning a battery terminal strap within a battery container which significantly simplifies manufacturing processing while potentially enhancing product performance. With reference to FIGS. 1–4, and according to a preferred embodiment of the present invention, a battery container 10 includes a plurality of cavities 12–22 defined therein. Formed integral to interior walls 24–30 of outer cavities 12 and 22, respectively, are complementary formations 32–38.

Figure 1:
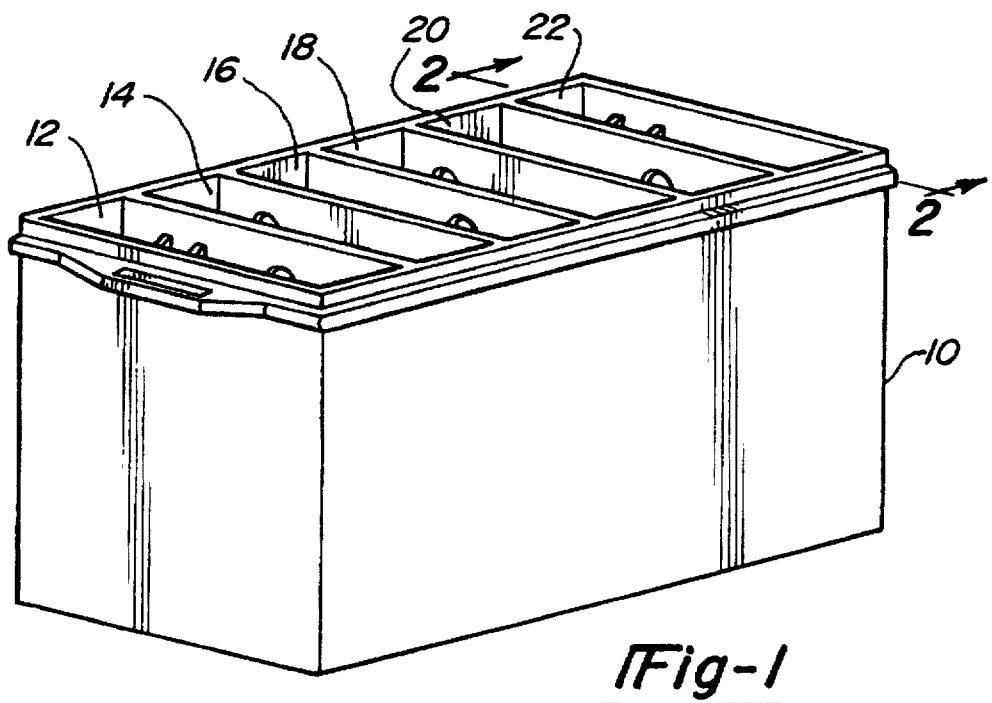
FIG. 1 is top, left and front perspective view of a battery container in accordance with a preferred embodiment of the present invention.
Figure 2:
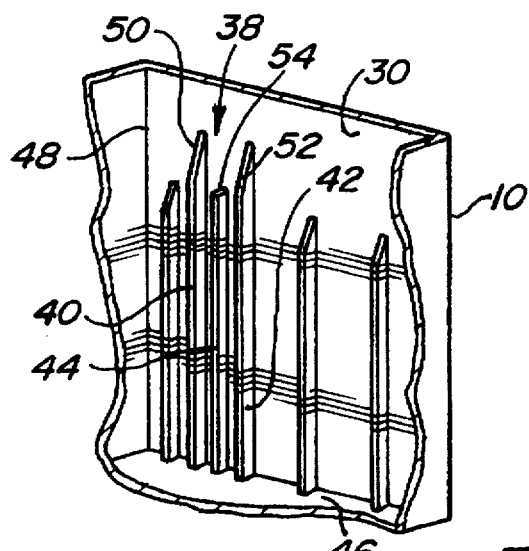
FIG. 2 is a perspective view of the container of FIG. 1 partially broken away along line 2—2 shown in FIG. 1.

With further reference to FIG. 2, each of formations 32–38 are described with reference to formation 38 which is typical. Formation 38 includes first and second outer ribs 40 and 42 formed integral to inner wall 30 of cavity 22. Formation 38 further includes an inner rib 44 also formed integral to inner wall 30. Each of ribs 40–44 extend from a bottom portion 46 of battery container 10 and nearly to a top portion 48 thereof. As can be further seen from FIG. 2, outer ribs 40 and 42 have a tapered upper portion 50 and 52, respectively, while inner rib 44 has a substantially square upper portion 54. Substantially square upper portion 54 will be described in more detail herein later, while tapered upper portions 50 and 52 facilitate placing the stacks within the container.

Figure 4:
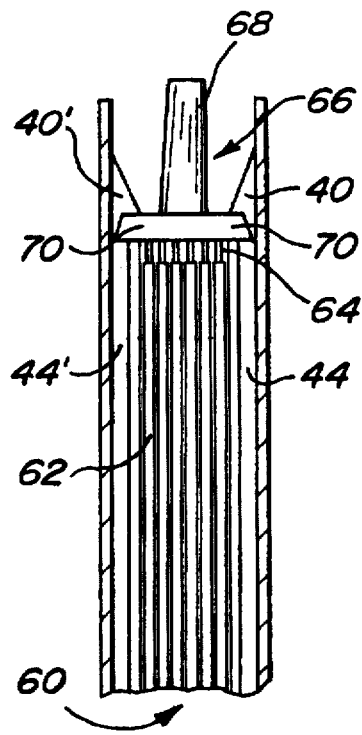
FIG. 4 is a sectional view along line 4—4 shown in FIG. 3 and further illustrating positioning of a terminal strap in accordance with a preferred embodiment of the present invention.
Figure 3:
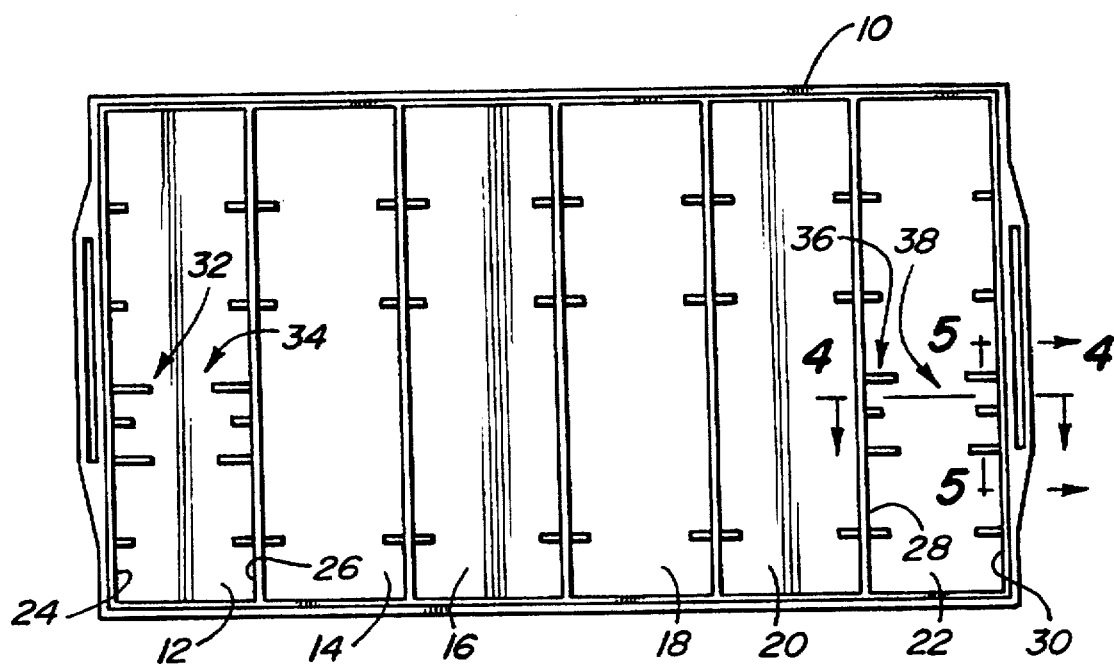
FIG. 3 is a top view of a battery container in accordance with a preferred embodiment of the present invention.
Figure 5:
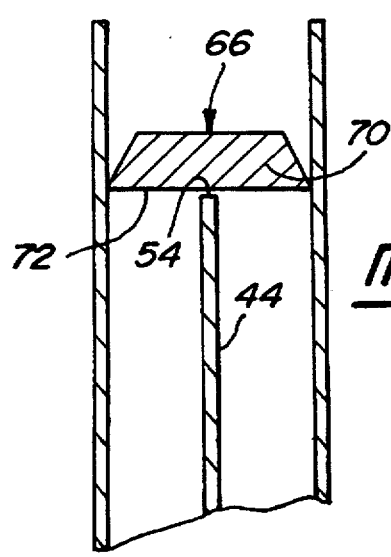
FIG. 5 is a sectional view taken along line 5—5 shown in FIG. 3 and further illustrating positioning of a terminal strap and stack in accordance with a preferred embodiment of the present invention.

With reference now to FIGS. 3–5, a stack 60 of plates 62 having lug portions 64 is shown inserted into cavity 22 of battery container 10. Cast onto lug portions 64 is a terminal strap 66 including a terminal post 68 and a base portion 70. It will be appreciated that stack 60, plates 62, lug portions 64, terminal strap 66, terminal post 68 and base portion 70 are typical of lead-acid type batteries as known in the art.

As best seen in FIGS. 4 and 5, when stack 60 is inserted into cavity 22, base portion 70 of terminal strap 66 engages ribs 40 and 42 and walls 28 and 30. As can be seen then, ribs 40 and 42 limit the side-to-side motion of terminal strap 66 within cavity 22, as do walls 28 and 30. It will be appreciated by those skilled in the art that the dimensions of base portion 70 will be slightly less than the separation of ribs 40 and 42 and walls 28 and 30 to allow ease of insertion, however, not so much so as to allow terminal strap 66 to move about to any great degree.

Figure 7:
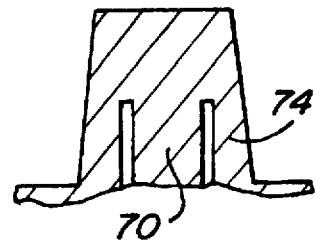
FIG. 7 is a partial sectional view of the terminal post fused with the battery container cover bushing of FIG. 6.
Figure 6:
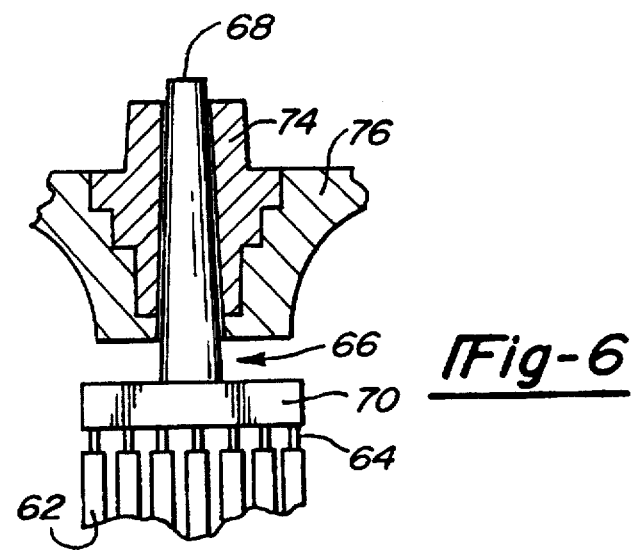
FIG. 6 is a sectional view illustrating a battery terminal strap and a battery container cover for use in accordance with the present invention.

With continued reference to FIG. 4, it can be seen that a bottom surface 72 of base portion 70 is closely adjacent the upper, square surface 54 of inner rib 44. Upper surface 54 is dimensioned such that prior to stack 60 moving too far down into cavity 22 such that terminal post 68 would not adequately project above bushing 74 formed into container cover 76 (FIG. 6) which is typical of container covers known in the art. Therefore, one will appreciate that given manufacturing tolerances, surface 72 may or may not contact square surface 54, and after the post burning operation, a sufficient coupling is made between terminal post 70 and bushing 74 (FIG. 7).

The present invention has been described in terms of a preferred embodiment for positioning terminal straps within a battery container of a lead-acid type battery. One of ordinary skill in the art will readily appreciate, however, that its scope defined in the subjoined claims extends beyond the teachings of the preferred embodiment. For example, the present invention may find application in positioning side terminal straps or dual terminal straps, or other elements of the battery requiring accurate positioning within the battery container. Moreover, the present invention need not be limited to batteries of the lead-acid type.

We claim:

1. A battery housing having a plurality of cell compartments each being adapted to receive a plate stack, each plate stack comprising a plurality of positive and negative plates interleaved with separators and having at least one of a terminal strap and a weld strap, each of the terminal strap and the weld strap base portion which coupled to one of the plurality of positive plates and the plurality of negative plates, the base portion having a bottom and pair of sides; and each cell compartment having a pair of vertical side walls, a pair of vertical end walls, a bottom and an open top, and wherein at least one of the cell compartments is adapted with a positioning formation, the positioning formation comprising complimentary formations on each of the vertical side walls, each of the complimentary formations comprising a pair of outer ribs and an inner rib, each of the outer ribs extending from the bottom to substantially near the top of the cell compartment, each of the inner ribs extending from the bottom toward the top of the cell compartment a distance less than said outer ribs and wherein an upper portion of the outer ribs are chamfered while an upper portion of the inner ribs are substantially square, the outer ribs being spaced relative to one another to receive and engage the sides of the base portion for positioning the base portion relative to the vertical end walls and the inner rib upper portion being adapted to engage the bottom of the base portion for positioning the base portion relative to the bottom of the cell compartment.

\* \* \* \* \*